(12) United States Patent
Moriya et al.

(10) Patent No.: US 8,421,726 B2
(45) Date of Patent: Apr. 16, 2013

(54) LIQUID CRYSTAL DISPLAY DEVICE, ACTIVE MATRIX SUBSTRATE, AND ELECTRONIC DEVICE

(75) Inventors: Yoshimizu Moriya, Osaka (JP); Hiroshi Yoshida, Osaka (JP); Noboru Matsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 250 days.

(21) Appl. No.: 13/059,775

(22) PCT Filed: May 28, 2009

(86) PCT No.: PCT/JP2009/059786
§ 371 (c)(1),
(2), (4) Date: Feb. 18, 2011

(87) PCT Pub. No.: WO2010/035548
PCT Pub. Date: Apr. 1, 2010

(65) Prior Publication Data
US 2011/0141096 A1 Jun. 16, 2011

(30) Foreign Application Priority Data

Sep. 24, 2008 (JP) ................................. 2008-244314

(51) Int. Cl.
*G09G 3/36* (2006.01)
(52) U.S. Cl.
USPC ............................. 345/87; 345/100; 345/211
(58) Field of Classification Search ............ 345/87–104, 345/204, 690
See application file for complete search history.

(56) References Cited

U.S. PATENT DOCUMENTS

| 5,712,652 A | 1/1998 | Sato |
| 5,790,213 A | 8/1998 | Sasaki |
| 6,504,593 B1 | 1/2003 | Noritake |
| 6,750,836 B1 | 6/2004 | Katayama et al. |
| 6,801,177 B2 | 10/2004 | Kudo et al. |

(Continued)

FOREIGN PATENT DOCUMENTS

| EP | 1 575 024 A1 | 9/2005 |
| JP | 8-76088 | 3/1996 |

(Continued)

OTHER PUBLICATIONS

International Search Report for PCT/JP2009/059786, mailed Jul. 7, 2009.

*Primary Examiner* — Amare Mengistu
*Assistant Examiner* — Jeffrey Steinberg
(74) *Attorney, Agent, or Firm* — Nixon & Vanderhye, P.C.

(57) ABSTRACT

A liquid crystal display device of the present invention includes: an active matrix substrate; a counter substrate; and a liquid crystal layer (512) including light-diffusing liquid crystal that has (i) when no voltage is being applied thereto, a first display state in which the liquid crystal molecules are aligned irregularly, and (ii) when a voltage is being applied, a second display state in which the liquid crystal molecules are aligned regularly, the active matrix substrate having a first surface which is below a surface on which pixel electrodes (504) are provided, the first surface having a first region on which a gap between adjacent pixel electrodes (504) is projected, the first region having partial regions which orthogonally cross gate bus lines GL (501), source bus lines SL (502) being each provided in a second region at a location shifted from a corresponding one of the partial regions so that the source bus line SL (502) is covered by the adjacent pixel electrodes (504).

9 Claims, 12 Drawing Sheets

U.S. PATENT DOCUMENTS

| | | |
|---|---|---|
| 2002/0075205 A1 | 6/2002 | Kimura |
| 2002/0075252 A1 | 6/2002 | Lee |
| 2007/0200977 A1* | 8/2007 | Egi et al. ......................... 349/96 |
| 2008/0174729 A1* | 7/2008 | Ohta et al. ..................... 349/147 |

FOREIGN PATENT DOCUMENTS

| | | |
|---|---|---|
| JP | 8-286170 | 11/1996 |
| JP | 10-039332 | 2/1998 |
| JP | 2001-83547 | 3/2001 |
| JP | 2001-091973 A | 4/2001 |
| JP | 2002-229526 | 8/2002 |
| JP | 2002-229532 | 8/2002 |
| JP | 2003-057676 | 2/2003 |
| JP | 2003-121865 A | 4/2003 |
| JP | 2006-343563 A | 12/2006 |
| JP | 2007-286237 | 11/2007 |
| WO | 00/16153 A1 | 3/2000 |

* cited by examiner

LIQUID CRYSTAL DISPLAY DEVICE, ACTIVE MATRIX SUBSTRATE, AND ELECTRONIC DEVICE

This application is the U.S. national phase of International Application No. PCT/JP2009/059786, filed 28 May 2009, which designated the U.S. and claims priority to Japanese Patent Application No. 2008-244314, filed 24 Sep. 2008, the entire contents of each of which are hereby incorporated by reference.

TECHNICAL FIELD

The present invention relates to a liquid crystal display device having a memory function.

BACKGROUND ART

In recent years, mobile terminals such as mobile telephones have had a problem of an increase in power consumption due to an increase in a number of functions available in such mobile terminals. In view of as much reduction in power consumption as possible in a mobile terminal, research has been conducted on a reduction of power consumption in a liquid crystal display device included in a display section which consumes a particularly large amount of power.

In view of a reduction in power consumption in a liquid crystal display device, when, for example, a mobile telephone displays a screen which shows only a small image change (for example, a clock time), video signals are written to liquid crystal capacitors in respective pixel forming sections, each for displaying a pixel image, at longer intervals.

In a case where video signals are written to liquid crystal capacitors at longer intervals the liquid crystal capacitors need to retain the applied voltages for an extended period of time. A liquid crystal display device such as the above thus includes a circuit (hereinafter referred to as "pixel memory circuit"), having a memory function, in each pixel forming section so as to retain voltages applied to the respective liquid crystal capacitors.

An example of such a liquid crystal display device including pixel memory circuits is disclosed in Patent Literature 1.

In view of a reduction in a thickness of a display section, a liquid crystal display device can include light-scattering liquid crystal which eliminates the need for polarizing plates. Light-scattering liquid crystal not only allows a reduction in the thickness of a liquid crystal display device, but also has such advantages as a high light use efficiency and a low viewing angle dependency both due to the elimination of the need for polarizing plates.

A mobile terminal such as a mobile telephone can thus include light scattering liquid crystal as liquid crystal for a liquid crystal display device, including pixel memory circuits, so as to enjoy the above advantages.

CITATION LIST

Patent Literature 1

Japanese Patent Application Publication, Tokukai, No. 2007-286237 A (Publication Date: Nov. 1, 2007)

SUMMARY OF INVENTION

Technical Problem

Light-scattering liquid crystal normally has a display characteristic in which (i) while no voltage is being applied thereto, molecules of the liquid crystal are aligned irregularly, and light is thus scattered (white display), and (ii) while a voltage is being applied to the light-scattering liquid crystal, the molecules are oriented in electric field directions, and the light-scattering liquid crystal thus becomes transparent (black display; mirror display involving use of, for example, reflective electrodes or an externally attached reflective plate). Thus, in a case where the liquid crystal display device includes pixel memory circuits, the following problems arise: (i) No voltage is applied to liquid crystal present in a gap between pixel electrodes which are vertically or horizontally adjacent to each other, and light is thus scattered in such a gap. As a result, contrast is decreased. (ii) The pixel memory circuits included in respective pixels decrease an aperture ratio of the liquid crystal display device.

In view of prevention of the above problems, a display device is proposed which has a SHA (super high aperture) structure in which pixel electrodes overlap lines such as signal lines.

An example of such a display device is illustrated in FIG. 12. The display device includes: a plurality of gate bus lines GL 501 (scanning signal lines); a plurality of source bus lines SL 502 (data signal lines) provided so as to be orthogonal to the plurality of gate bus lines GL 501; switching elements (not shown) provided at respective intersections of the plurality of gate bus lines GL 501 with the plurality of source bus lines SL 502; pixel memory circuit sections 503 provided at the respective intersections; pixel electrodes (made of ITO, for example) 504 provided for the respective pixel memory circuit sections 503; and reflective electrodes (made of AL or Mo, for example) 505 provided for the respective pixel memory circuit sections 503.

The pixel electrodes 504 of the display device having the above arrangement are provided so as to overlap (i) the data signal lines 502 (see FIG. 13) and (ii) first voltage supply lines VLA 506 connected to the pixel memory circuit sections 503.

The above structure, however, creates a different problem. That is, a flicker becomes visible over an entire active area in synchronization with inversion driving for low frequency driving (on the order of several hertz) as in a clock time display on a mobile telephone. Such a flicker is particularly significant in a region (that is, a region 800 in FIG. 12) corresponding to a data signal line provided between horizontally adjacent pixels.

This is because of the following: As illustrated in FIG. 12, a first voltage supply line VLA 506 connected to pixel memory circuits 503 is provided between vertically adjacent pixel electrodes 504. The first voltage supply line VLA 506 reliably applies, to liquid crystal, either a voltage for a black display or a voltage for a white display in synchronization with an inversion cycle of a counter voltage. Between horizontally adjacent pixel electrodes 504, in contrast, a data signal line 502 is provided. The data signal line 502 does not change in voltage from frame to frame when no signal is written thereto. As such, an effective voltage, applied to liquid crystal in a region corresponding to the data signal line 502, varies between consecutive frames to an extent which may only be small. As a result of this variation, a flicker becomes visible in the region 800 due to the low frequencies.

It is thus an object of the present invention to provide a liquid crystal display device which causes no flicker and which has high display quality.

Solution to Problem

In order to solve the above problem, a liquid crystal display device of the present invention includes: an active matrix substrate; a counter substrate; and light-diffusing liquid crystal sealed between the active matrix substrate and the counter substrate, the light-diffusing liquid crystal having, (i) while no voltage is being applied thereto, a first display state in which liquid crystal molecules are aligned irregularly, and (ii) while a voltage is being applied to the light-diffusing liquid crystal, a second display state in which the liquid crystal molecules are oriented regularly, the active matrix substrate including: a plurality of data signal lines for transmitting a plurality of video signals representative of an image to be displayed; a plurality of scanning signal lines crossing the plurality of data signal lines; pixel electrodes provided in a matrix pattern at respective intersections of the plurality of data signal lines with the plurality of scanning signal lines; and display data memory circuits provided for the respective pixel electrodes, each of the display data memory circuits, in accordance with a video signal transmitted through a corresponding one of the plurality of data signal lines, (i) receiving via a first supply line a first display data for achieving the first display state, and via a second supply line a second display data for achieving the second display state, and (ii) storing the first display data and the second display data, the counter substrate including: a counter electrode provided so as to face the pixel electrodes of the active matrix substrate, the counter electrode applying a counter voltage to the light-diffusing liquid crystal in synchronization with a voltage applied to each of the pixel electrodes, the active matrix substrate having a first surface which is below a surface thereof on which the pixel electrodes are provided, the first surface having a first region on which a gap between adjacent pixel electrodes is projected, the first region having partial regions which orthogonally cross the plurality of scanning signal lines, the plurality of data signal lines being each provided in a second region located to a direction of one of said adjacent pixel electrodes in relation to a corresponding one of the partial regions.

According to the above arrangement, the plurality of data signal lines are each provided in the second region. As such, the plurality of data signal lines are each at least partially covered by pixel electrodes. In other words, the plurality of data signal lines are each at least partially shielded electrically by such pixel electrodes.

With the arrangement, it is possible to reduce an influence, on the plurality of data signal lines, by the counter voltage applied from the counter electrode through the gap. As a result, it is possible to reduce a change in effective voltage applied to liquid crystal present in the gap.

It follows that even in a case where the liquid crystal is driven at low frequencies such as frequencies on the order of several hertz, only a small change is caused, as described above, in effective voltage applied to liquid crystal present in the gap between pixel electrodes adjacent in a direction in which the plurality of scanning signal lines extend. Therefore, it is possible to (i) prevent a flicker from occurring due to such a change in effective voltage, and thus (ii) improve display quality.

Further, the arrangement below is preferably employed so as to further reduce the influence, on the plurality of data signal lines, by the counter voltage applied from the counter electrode through the gap.

The liquid crystal display device of the present invention may preferably be arranged such that the second region does not overlap said corresponding one of the partial regions.

With the above arrangement, no data signal lines are provided in the first region. As such, it is possible to further reduce the influence, on the plurality of data signal lines, by the counter voltage applied from the counter electrode through the gap. As a result, it is possible to further reduce a change in effective voltage applied to liquid crystal present in the gap.

The liquid crystal display device of the present invention may preferably further include: either first supply lines or second supply lines in the first region; and shared lines provided in the partial regions so as to be each electrically connected to either the first supply lines or the second supply lines.

With the above arrangement, the shared lines are each supplied with a signal which is identical in phase to a signal supplied to either the first supply lines or the second supply lines. As such, the shared lines are each supplied with a signal which is either identical or opposite in phase to a signal applied from the counter electrode of the counter substrate. This blocks a region in the gap between adjacent pixel electrodes in which region no voltage is applied to liquid crystal and which region thus causes contrast to decrease due to scattered light. Further, the region is not easily subject to the influence of a signal applied from the counter electrode of the counter substrate. As a result, it is possible to substantially eliminate the occurrence of a flicker in the gap without use of a blocking means, such as a black matrix, on a side on which the counter substrate is present.

The liquid crystal display device of the present invention may preferably be arranged such that the plurality of data signal lines and the shared lines are provided in an identical layer on the active matrix substrate.

With the arrangement, it is possible to simultaneously form the plurality of data signal lines and the shared lines. It follows that it is possible to reduce a time necessary to produce the liquid crystal display device as compared to a case in which the plurality of data signal lines and the shared lines are formed separately from each other.

The liquid crystal display device of the present invention may preferably be arranged such that the first supply lines, the second supply lines, and the shared lines are provided in three respective layers individually separated by an insulating film; and the shared lines are each electrically connected, via a contact hole, to either each of the first supply lines or each of the second supply lines at a location at which the shared line crosses either the first supply line or the second supply line.

With the arrangement, the first supply lines, the second supply lines, and the shared lines are provided in three respective layers individually separated by an insulating film, and the shared lines are each electrically connected, via a contact hole, to either each of the first supply lines or each of the second supply lines at a location at which the shared line crosses either the first supply line or the second supply line. As such, the shared lines are each electrically connected to either the first supply lines or the second supply lines simply at locations minimally required. As a result, it is possible to prevent a leak between lines in an identical layer.

Advantageous Effects of Invention

As described above, a liquid crystal display device of the present invention includes: an active matrix substrate; a counter substrate; and light-diffusing liquid crystal sealed between the active matrix substrate and the counter substrate, the light-diffusing liquid crystal having, (i) while no voltage is being applied thereto, a first display state in which liquid crystal molecules are aligned irregularly, and while a voltage is being applied to the light-diffusing liquid crystal, a second display state in which the liquid crystal molecules are oriented regularly, the active matrix substrate including: a plurality of data signal lines for transmitting a plurality of video signals representative of an image to be displayed; a plurality of scanning signal lines crossing the plurality of data signal lines; pixel electrodes provided in a matrix pattern at respective intersections of the plurality of data signal lines with the plurality of scanning signal lines; and display data memory circuits provided for the respective pixel electrodes, each of the display data memory circuits, in accordance with a video signal transmitted through a corresponding one of the plurality of data signal lines, (i) receiving via a first supply line a first display data for achieving the first display state, and via a second supply line a second display data for achieving the second display state, and (ii) storing the first display data and the second display data, the counter substrate including: a counter electrode provided so as to face the pixel electrodes of the active matrix substrate, the counter electrode applying a counter voltage to the light-diffusing liquid crystal in synchronization with a voltage applied to each of the pixel electrodes, the active matrix substrate having a first surface which is below a surface thereof on which the pixel electrodes are provided, the first surface having a first region on which a gap between adjacent pixel electrodes is projected, the first region having partial regions which orthogonally cross the plurality of scanning signal lines, the plurality of data signal lines being each provided in a second region located to a direction of one of said adjacent pixel electrodes in relation to a corresponding one of the partial regions. The plurality of data signal lines are thus each at least partially covered by pixel electrodes. In other words, the plurality of data signal lines are each at least partially shielded electrically by such pixel electrodes.

With the arrangement, it is possible to reduce an influence, on the plurality of data signal lines, by the counter voltage applied from the counter electrode through the gap. As a result, it is possible to reduce a change in effective voltage applied to liquid crystal present in the gap.

It follows that even in a case where the liquid crystal is driven at low frequencies such as frequencies on the order of several hertz, only a small change is caused, as described above, in effective voltage applied to liquid crystal present in the gap between pixel electrodes adjacent in a direction in which the plurality of scanning signal lines extend. Therefore, it is possible to (i) prevent a flicker from occurring due to such a change in effective voltage, and thus (ii) improve display quality.

DESCRIPTION OF EMBODIMENTS

Embodiment 1

An embodiment of the present invention is described below.

Figure 4:
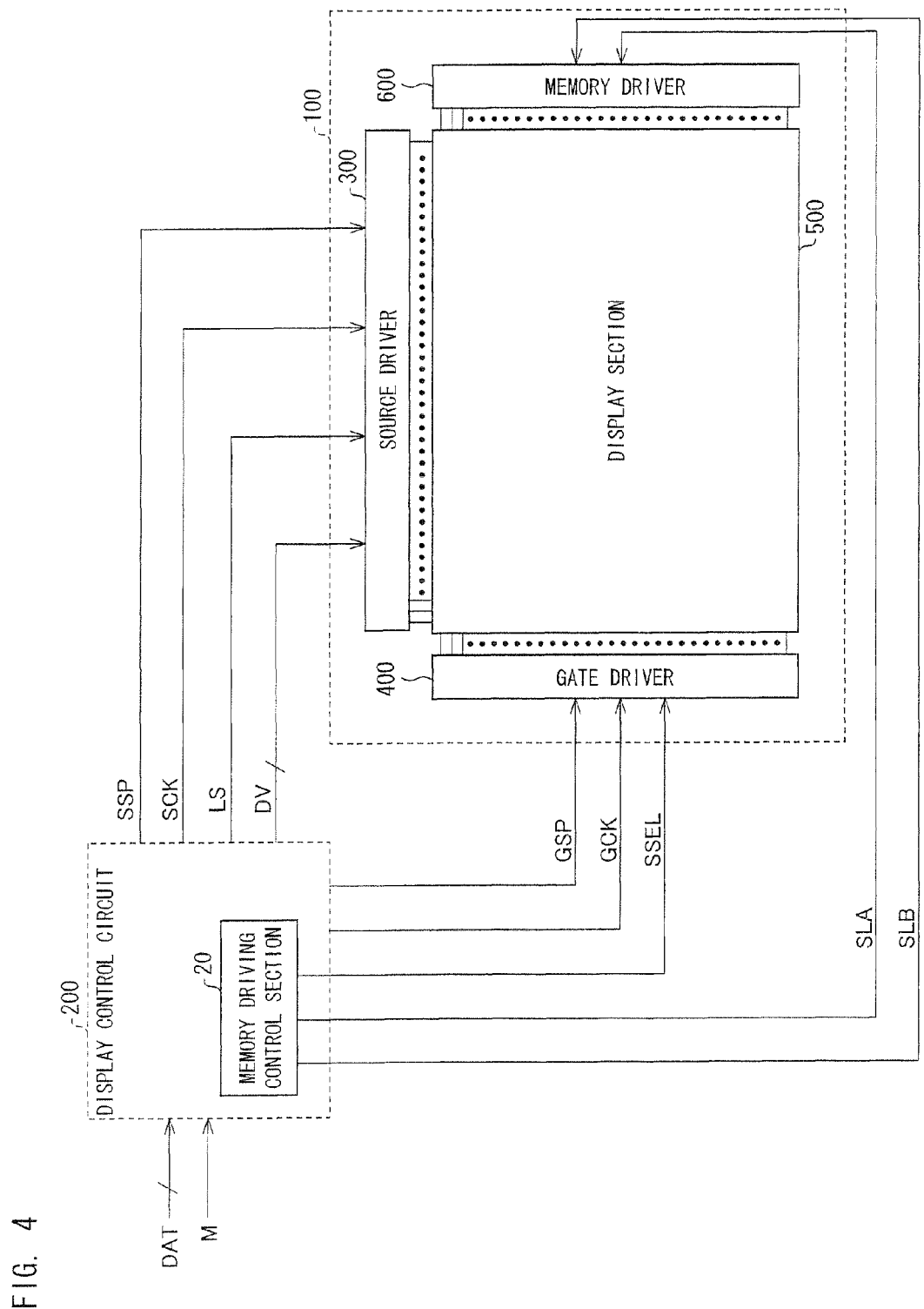
FIG. 4 is a block diagram illustrating the entire arrangement of the liquid crystal display device.

FIG. 4 is a block diagram illustrating an entire arrangement of a liquid crystal display device in accordance with the embodiment of the present invention.

As illustrated in FIG. 4, the liquid crystal display device includes a liquid crystal display panel 100 and a display control circuit 200.

The liquid crystal display panel 100 includes: a source driver (video signal line driving circuit) 300; a gate driver (scanning signal line driving circuit) 400; a display section 500; and a memory driver 600 serving as a voltage supply generating circuit.

The display control circuit 200 includes a memory driving control section 20 serving as a duty ratio setting circuit.

The display section 500 includes source bus lines (data signal lines), gate bus lines (scanning signal lines), and the following later-described lines: memory driving selection lines; first voltage supply lines; second voltage supply lines; first power supply lines; and second power supply lines. The source bus lines are connected to the source driver 300. The gate bus lines and the memory driving selection lines are connected to the gate driver 400. The first voltage supply lines and the second voltage supply lines are connected to the memory driver 600.

The display section 500 is a liquid crystal display panel including: an active matrix substrate; a counter substrate; and light-diffusing liquid crystal sealed between the active matrix substrate and the counter substrate. The light-diffusing liquid crystal is (i) while no voltage is being applied thereto, in a first display state in which molecules of the liquid crystal are aligned irregularly, and (ii) while a voltage is being applied to the liquid crystal, in a second display state in which the liquid crystal molecules are aligned regularly.

The display section 500 further includes a plurality of pixel forming sections provided in a matrix pattern at respective intersections of the gate bus lines with the source bus lines. The pixel forming sections include: respective pixel electrodes each for applying, to a liquid crystal capacitor (described later), a voltage corresponding to an image to be displayed; a common electrode which serves as a counter electrode and which is provided so as to be common to the plurality of pixel forming sections; and a liquid crystal layer which is sandwiched between the pixel electrodes and the common electrode and which is provided so as to be common to the plurality of pixel forming sections.

The display section 500, in a case where it is a color display section which carries out color display, further includes pixel memory circuits each of which (i) serves as a memory circuit and (ii) retains 1-bit data for each pixel (hereinafter referred to as "pixel unit") including three sub-pixels of red (R), green (G), and blue (B).

The display section 500, in a case where it is a monochrome display section which carries out monochrome display, further includes pixel memory circuits such that one of them is provided for each pixel having a pitch which is three times as large as a pitch (sub-pixel pitch) of each color pixel of the color type.

In the description below, it is assumed that the liquid crystal display device of the present embodiment is a normally white, color liquid crystal display device.

The liquid crystal display device of the present embodiment is driven by a method which is switched between "normal driving" and "memory driving." The "normal driving" refers to a general method for driving a liquid crystal display device, and is specifically a method of writing a signal (that is, applying a voltage) to each liquid crystal capacitor on the basis of a video signal applied to a corresponding source bus line. On the other hand, the "memory driving" refers to a method of writing a signal to each liquid crystal capacitor on the basis of data stored in a corresponding pixel memory circuit. Note that in the description below, a display state achieved in the normal driving is referred to as "first display mode," and a display state achieved in the memory driving is referred to as "second display mode."

The display control circuit 200 receives image data DAT and a display mode instruction signal M both transmitted from the outside. The display control circuit 200 outputs a digital video signal DV and the following signals for controlling an image display in the display section 500: a source start pulse signal SSP; a source clock signal SCK; a latch strobe signal LS; a gate start pulse signal GSP; a gate clock signal GCK; a first voltage supply control signal SAL; a second voltage supply control signal SBL; and a memory driving control signal SSEL.

The source driver 300 (i) receives digital video signals DV, source start pulse signals SSP, source clock signals SCK, and latch strobe signals LS, all supplied from the display control circuit 200, and thus (ii) applies video signals to the respective source bus lines to drive them.

The gate driver 400, in the normal driving, repeats a cycle which has a length of one vertical scanning period and during which the gate driver 400 sequentially applies active scanning signals to the respective gate bus lines. The gate driver 400 repeats the cycle on the basis of gate start pulse signals GSP and gate clock signals GCK, both supplied from the display control circuit 200, so as to sequentially select each of the gate bus lines for one horizontal scanning period.

When the normal driving is switched to the memory driving, the gate driver 400 (i) sequentially applies active scanning signals to the respective gate bus lines on the basis of the gate start pulse signals GSP and the gate clock signals GCK, both supplied from the display control circuit 200, so as to sequentially select each of the gate bus lines for one horizontal scanning period, and simultaneously (ii) sequentially applies active signals to the respective memory driving selection lines on the basis of memory driving control signals SSEL and the gate clock signals GCK, both supplied from the display control circuit 200, so as to sequentially select each of the memory driving selection lines for one horizontal scanning period. In the memory driving, the gate driver 400 applies no active scanning signals to the respective gate bus lines, but applies active signals to the respective memory driving selection lines SEL1 to SELm.

The memory driver 600 applies voltage signals, namely VLA and VLB, to the first voltage supply lines and the second voltage supply lines, respectively, on the basis of first voltage supply control signals SLA and second voltage supply control signals SLB, both supplied from the display control circuit 200.

The voltage signal VLA is a voltage signal which is opposite in phase to a counter voltage applied to the counter electrode. The voltage signal VLB is a voltage signal which is identical in phase to the counter voltage applied to the counter electrode.

Figure 1:
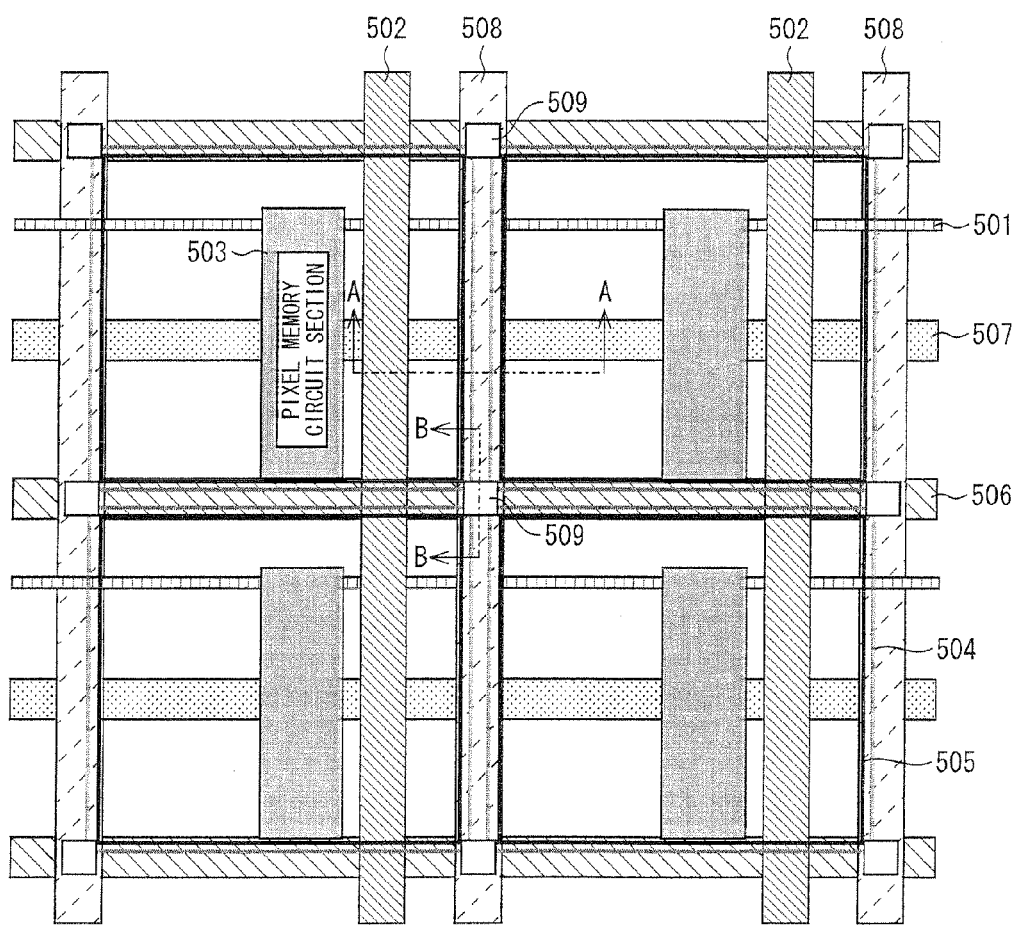
FIG. 1 is a plan view schematically illustrating the vicinity of pixel electrodes in a display section of a liquid crystal display device in accordance with an embodiment of the present invention.
Figure 2:
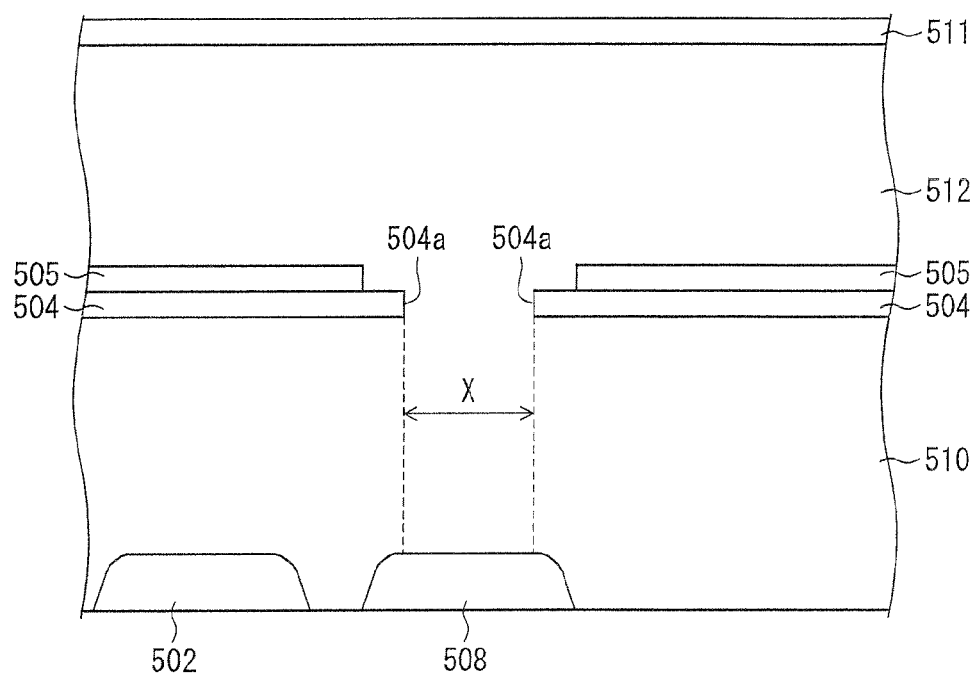
FIG. 2 is a cross-sectional view taken along line A-A of FIG. 1.
Figure 3:
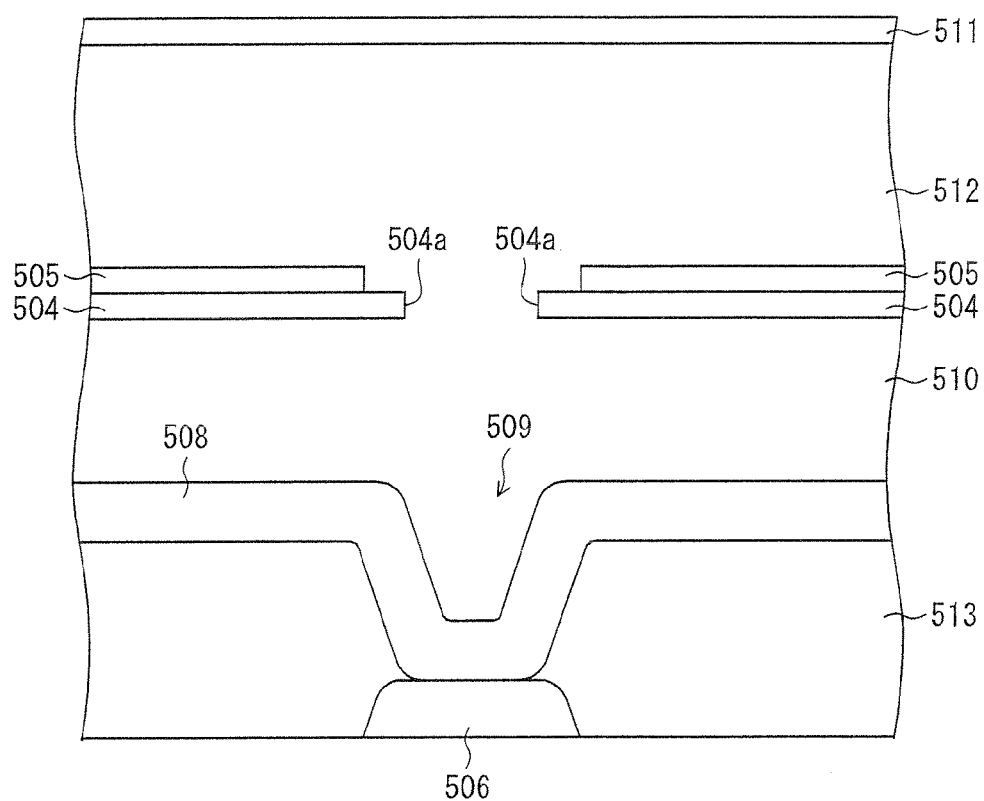
FIG. 3 is a cross-sectional view taken along line B-B of FIG. 1.

With reference to FIGS. 1 through 3, the following description deals with a configuration observed in the vicinity of the pixel electrodes of the display section 500.

FIG. 1 is a plan view schematically illustrating the vicinity of the pixel electrodes of the display section 500. FIG. 1 omits the counter electrode for convenience of explanation.

As illustrated in FIG. 1, the display section 500 includes an active matrix substrate in which (i) a plurality of gate bus lines GL 501 (scanning signal lines) are provided so as to be orthogonal to a plurality of source bus lines SL 502 (data signal lines), and (ii) a switching element (not shown) and a pixel memory circuit section 503 (display data memory circuit) are provided at each of respective intersections of the gate bus lines GL 501 with the source bus lines SL 502. The source bus lines SL 502 are each supplied with a plurality of video signals representative of an image to be displayed. The display section 500 further includes a counter substrate (not shown) provided so as to face the active matrix substrate.

The active matrix substrate is further provided with, for each of the pixel memory circuit sections 503, a pixel electrode (made of ITO, for example) 504 and a reflective electrode (made of Al or Mo, for example) 505.

The pixel memory circuit sections 503 are each connected to one of the gate bus lines GL 501 and one of the source bus lines SL 502, and additionally to a first voltage supply line VLA 506 and a second voltage supply line VLB 507 which are supplied with voltage signals VLA and VLB, respectively, from the memory driver 600. The first voltage supply lines VLA 506 and the second voltage supply lines VLB 507 are provided in parallel with the gate bus lines GL 501. The first voltage supply lines VLA 506 each extend between adjacent pixel electrodes 504, whereas the second voltage supply lines VLB 507 are each provided at such a location as to be overlapped by pixel electrodes 504.

The first voltage supply lines VLA 506 are each a line (first supply line) for supplying a voltage signal VLA (first display data) from the memory driver 600 to each corresponding pixel memory circuit section 503. The second voltage supply lines VLB 507 are each a line (second supply line) for supplying a voltage signal VLB (second display data) from the memory driver 600 to each corresponding the pixel memory circuit section 503.

The pixel memory circuit sections 503 are provided for the respective pixel electrodes 504 as described above. Each of the pixel memory circuit sections 503, on the basis of video signals supplied via a corresponding one of the source bus lines SL 502, receives (i) via a first voltage supply line VLA 506, that is, a first supply line, a voltage signal VLA indicative of a first display data for achieving the first display state of the display section 500, and (ii) via a second voltage supply line VLA 507, that is, a second supply line, a voltage signal VLB indicative of a second display data for achieving the second display state of the display section 500. The pixel memory circuit sections 503 each store the first display data and the second display data.

Figure 12:
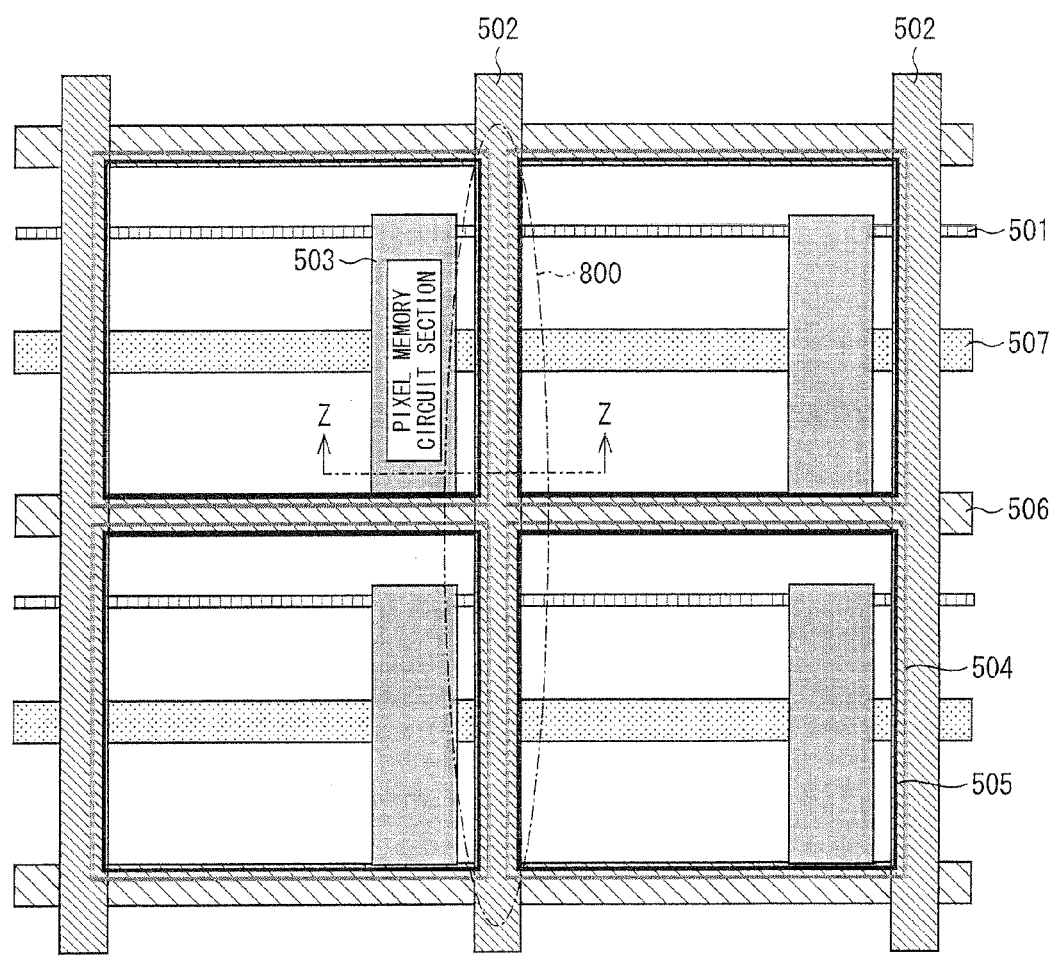
FIG. 12 is a plan view schematically illustrating the vicinity of pixel electrodes in a display section of a conventional liquid crystal display device.
Figure 13:
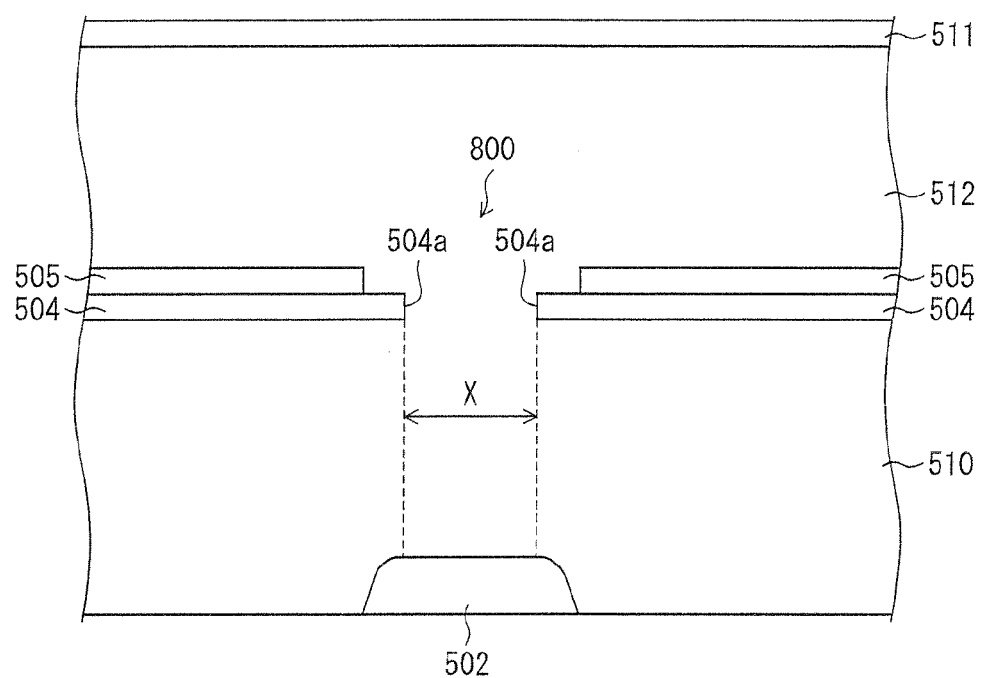
FIG. 13 is a cross-sectional view taken along line Z-Z of FIG. 12.

Each of the source bus lines SL 502 would normally be provided in a first region of the active matrix substrate on which first region a gap 800 between adjacent pixel electrodes 504 and 504 is projected (see FIG. 12).

The source bus lines SL 502 of the present embodiment are, in contrast, each provided at a location, slightly shifted from a location of the first region, so as to be overlapped by one of adjacent pixel electrodes 504 (see FIG. 1). More specifically, (i) the active matrix substrate has a first surface which is below a surface on which the pixel electrodes are provided, (ii) the first surface has the above first region, (iii) the first region has partial regions which orthogonally cross the gate bus lines GL 501, and (iv) the source bus lines SL 502 are each provided in a second region located, to a direction of one of the adjacent pixel electrodes 504, relative to a corresponding one of the partial regions of the first region on the first surface of the active matrix substrate.

The active matrix substrate is provided with, instead of a source bus line SL 502, a shared voltage supply line 508 (shared line) between adjacent pixel electrodes 504 and 504. Each of the shared voltage supply lines 508 is electrically connected to each of the first voltage supply lines VLA 506, via a contact hole 509, at a location at which the shared voltage supply line 508 crosses the first voltage supply line VLA 506.

FIG. 2 is a cross-sectional view taken along line A-A of FIG. 1.

As illustrated in FIG. 2, the shared voltage supply lines 508 are each provided, in a layer (identical layer) in which the source bus lines SL 502 are provided, so as to have a width which is larger than a distance X between respective end sections 504a and 504a of adjacent pixel electrodes 504 and 504. The shared voltage supply lines 508 can be made of any material that is electrically conductive, and are preferably metal wires in particular.

The shared voltage supply lines 508 and the source bus lines SL 502 are separated from the pixel electrodes 504 by a resin film (JAS) 510 for creating a SHA structure.

Further, the reflective electrodes 505 on the respective pixel electrodes 504 provided on a side on which the active matrix substrate is present are separated from the counter electrode 511 by a liquid crystal layer 512 made of light-scattering liquid crystal. The counter electrode 511 is provided on a side on which the counter substrate is present, and is used to apply a counter voltage to the light-diffusing liquid crystal (described later) in synchronization with voltages applied to the respective pixel electrodes 504. The light-scattering liquid crystal serves to carry out, (i) while no voltage is being applied thereto, a white display in which molecules of the liquid crystal are aligned irregularly and light is thus diffused, and (ii) while a voltage is being applied to the light scattering liquid crystal, a black display (a mirror display involving use of, for example, the reflective electrodes or an externally attached reflective plate) in which the liquid crystal molecules are aligned regularly.

FIG. 3 is a cross-sectional view taken along line B-B of FIG. 1.

As illustrated in FIG. 3, the shared voltage supply lines 508 are each electrically connected, via a contact hole 509, to each of the first voltage supply lines VLA 506 provided below the data signal lines 502. The shared voltage supply lines 508 are provided on top of an interlayer insulating film (made of SiO, for example) 513.

Since the shared voltage supply lines 508 are each electrically connected to each of the first voltage supply lines VLA 506 as described above, each of the pixel electrodes 504 is surrounded by a region to which an identical signal, that is, the voltage signal VLA, is applied. In other words, the region surrounding each of the pixel electrodes 504 is supplied with a voltage signal which is opposite in phase to the counter voltage applied to the counter electrode 511.

The following description deals with a detailed arrangement of the pixel memory circuit sections 503.

Figure 5:
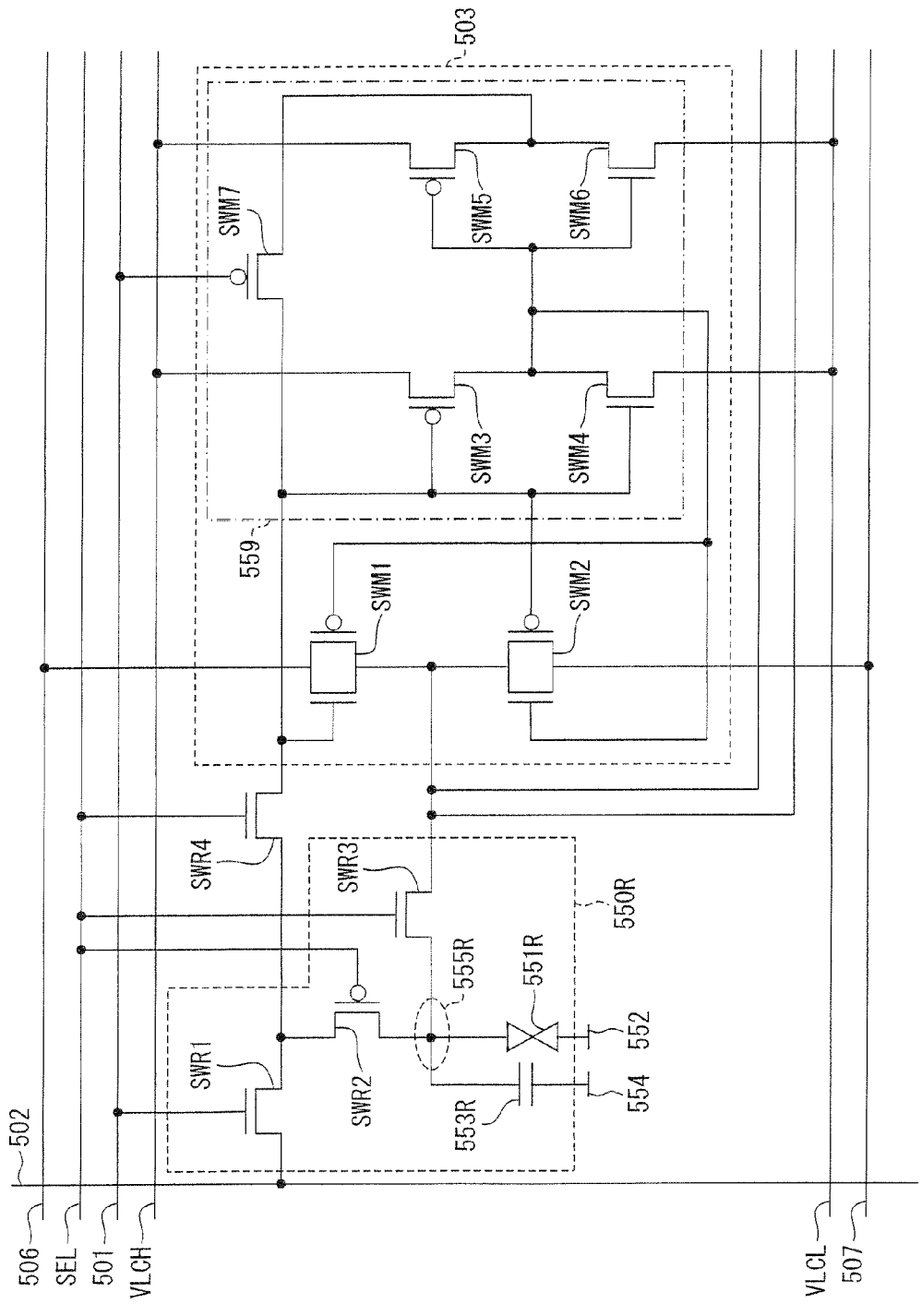
FIG. 5 is an equivalent circuit diagram illustrating a pixel memory circuit section included in the liquid crystal display device.

FIG. 5 is an equivalent circuit diagram illustrating a detailed arrangement of the pixel memory circuit sections 503.

The pixel memory circuit sections 503 each include: CMOS switches SWM1 and SWM2 each including a p-type TFT and an n-type TFT; switches SWM4 and SWM6 each including an n-type TFT; and switches SWM3, SWM5, and SWM7 each including a p-type TFT.

The switches SWM3 and SWM5 each have a source terminal which is connected to a first power supply line VLCH. The switches SWM4 and SWM6 each have a source terminal which is connected to a second power supply line VLCL. The switch SWM7 has a gate terminal which is connected to a gate bus line GL 501. Each of (i) a circuit including the switches SWM3 and SWM4 and (ii) a circuit including the switches SWM5 and SWM6 serves as an inverter circuit. The switch SWM7 serves as a transfer gate. With the above arrangement, a circuit including the switches SWM3, SWM4, SWM5, SWM6, and SWM7 serves as a data retaining circuit 559 which retains 1 bit data.

The switch SWM1 has (i) an input terminal which is connected to a first voltage supply line VLA 506 and (ii) an output terminal which is connected to a source terminal of a switch SWR3 and an output terminal of the switch SWM2. The switch SWM2 has an input terminal which is connected to a second voltage supply line VLB 507. The output terminal of the switch SWM2 is connected to the source terminal of the switch SWR3 and to the output terminal of the switch SWM1.

Figure 6:
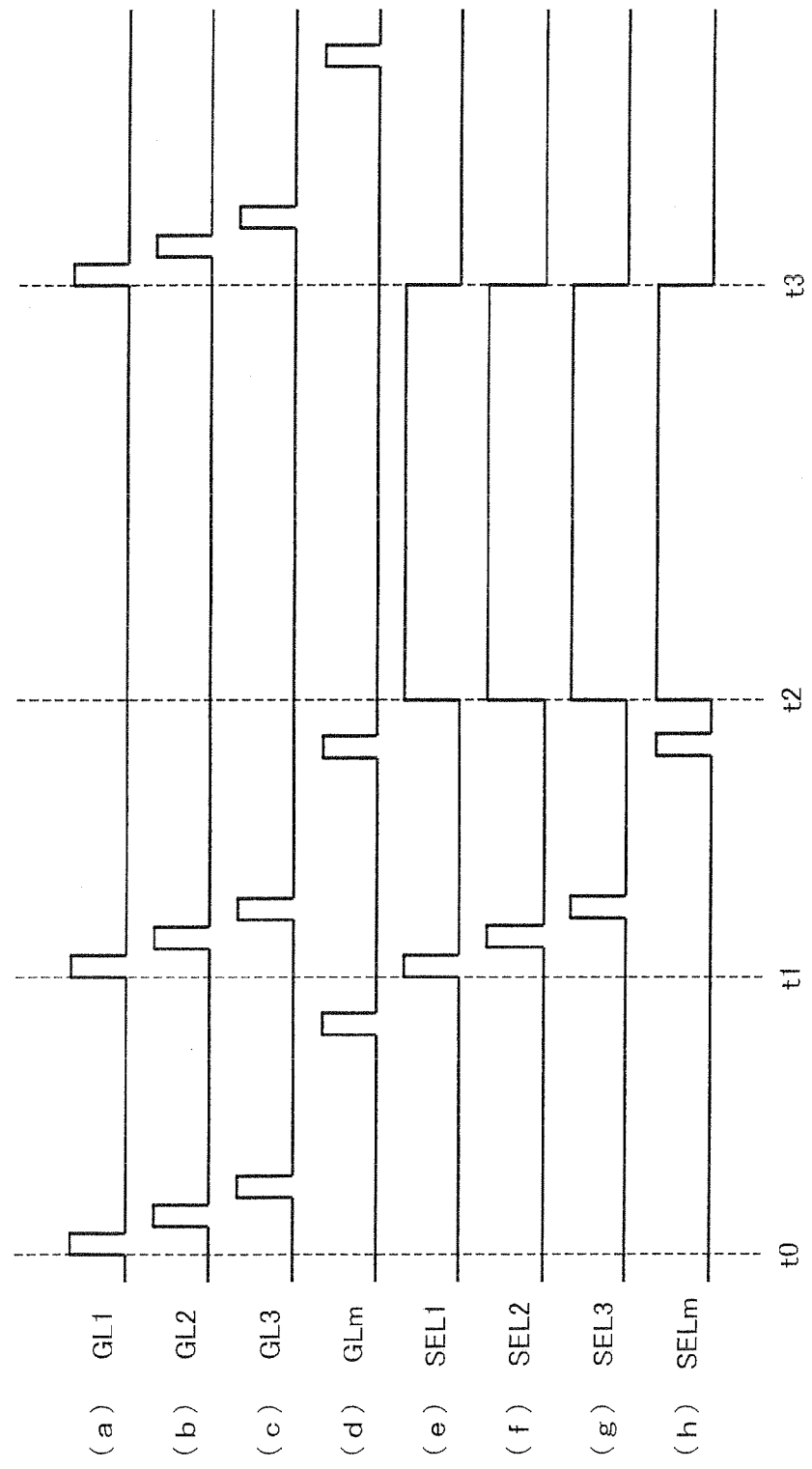
FIG. 6 is a diagram illustrating respective signal waveforms for gate bus lines and memory driving selection lines.

The n-type TFT of the switch SWM1 has a gate terminal which is connected to a drain terminal of a switch SWR4 and to the data retaining circuit 559. The p-type TFT of the switch SWM1 has a gate terminal which is connected to a gate terminal of the n-type TFT of the switch SWM2 and to the data retaining circuit 559. The gate terminal of the n-type TFT of the switch SWM2 is connected to the gate terminal of the p-type TFT of the switch SWM1 and to the data retaining circuit 559. The p-type TFT of the switch SWM2 has a gate terminal which is connected to the data retaining circuit 559. The following description deals with how the pixels are driven in the present embodiment. In the description below, it is assumed that the liquid crystal display device of the present embodiment includes m gate bus lines. FIG. 6 is a diagram illustrating respective signal waveforms for first, second, third, and m-th gate bus lines GL1, GL2, GL3, and GLm and first, second, third, and m-th memory driving selection lines SEL1, SEL2, SEL3, and SELm. As mentioned above, according to the present embodiment, switching is carried out between the normal driving for the first display mode and the memory driving for the second display mode. This switching is carried out in accordance with a display mode instruction signal M supplied from the outside to the display control circuit 200. The following description deals one by one with (i) a driving method employed for the normal driving, (ii) a driving method employed when the normal driving is switched to the memory driving, and (iii) a driving method employed for the memory driving.

The driving method employed for the normal driving will be described first.

FIG. 6 illustrates the normal driving during a period from a time t0 to a time t1. As indicated by (a) through (d) in FIG. 6, in the normal driving, the gate bus lines GL1 to GLm are sequentially supplied with respective active signals each for a predetermined period. The memory driving selection lines SEL1 to SELm are, in contrast, supplied with no active signals during the normal driving.

With attention on a given pixel unit, in a case where an active signal is applied to a gate bus line GL for the given pixel unit, a switch SWR1 is set to an ON state. Since no active signal is applied to a memory driving selection line SEL during the normal driving, a switch SWR2 is set to the ON state, whereas the switch SWR3 and SWR4 are each set to an OFF state. As such, a signal is written to a liquid crystal capacitor 551R in accordance with a video signal applied to a source bus lines SL 502. Video signals are written as described above to liquid crystal capacitors 551R of all pixel units during one frame period, and a desired image is thus displayed on the display section 500.

The above description refers to FIG. 5, which illustrates an R pixel out of R, G, and B pixels, to describe only how the R pixel is driven. The G pixel and the B pixel are each driven in a manner similar to the manner in which the R pixel is driven.

The driving method employed when the normal driving is switched to the memory driving will be described next.

FIG. 6 illustrates, during a period from the time t1 to a time t2, the driving method employed for switching the normal driving to the memory driving. During this period, the gate bus lines GL1 to GLm are sequentially supplied with respective active signals each for a predetermined period as indicated by (a) through (d) in FIG. 6, while the memory driving selection lines SEL1 to SELm are also sequentially supplied with respective active signals each for a predetermined period as indicated by (e) through (h) in FIG. 6.

With attention on a given pixel unit, in a case where (i) an active signal is applied to a gate bus line GL for the given pixel unit, and (ii) an active signal is applied to a memory driving selection line SEL for the given pixel unit, the switches SWR1, SWR3, and SWR4 are each set to the ON state, while the switch SWR2 is set to the OFF state. As such, a video signal applied to a source bus line SL is supplied to a pixel memory circuit 503, and the video signal is thus stored in a data retaining circuit 559 in the pixel memory circuit 503 as in-memory data MD.

During the period from the t1 to the time t2, the pixel memory circuits 503 of all pixel units each store in-memory data MD as described above. In the description below, it is assumed that in a case where video signals are binarized (that is, video signals are divided into (i) data having a high logical level and (ii) data having a low logical level), a pixel memory circuit 503 stores "1" as the in-memory data MD if the logical level is high, whereas a pixel memory circuit 503 stores "0" as the in-memory data MD if the logical level is low.

The driving method employed for the memory driving will be described next.

FIG. 6 illustrates the memory driving during a period from the time t2 to a time t3. As indicated by (a) through (d) in FIG. 6, during the memory driving, the gate bus lines GL1 to GLm are supplied with no active signal. As such, the switch SWR1 is constantly set to the OFF state during this period. It follows that since the switch SWR1 is set to the OFF state, a value of the in-memory data MD is not subject to a video signal supplied via a source bus line SL during the memory driving.

On the other hand, the memory driving selection lines SEL1 to SELm are all supplied with respective active signals during this period as indicated by (e) through (h) in FIG. 6. As such, during the memory driving, the switches SWR2, SWG2, and SWB2 are constantly set to the OFF state, whereas the switches SWR3, SWG3, and SWB3 are constantly set to the ON state. Thus, a signal is written to the liquid crystal capacitor 551R in accordance with a voltage signal supplied from either the output terminal of the switch SWM1 or the output terminal of the switch SWM2 in the pixel memory circuit 503. It follows that during the memory driving, a signal is written to the liquid crystal capacitor 551R in accordance with a common voltage signal. This allows a monochrome display during the memory driving. The following description deals in detail with the memory driving on the basis of examples.

Figure 7:
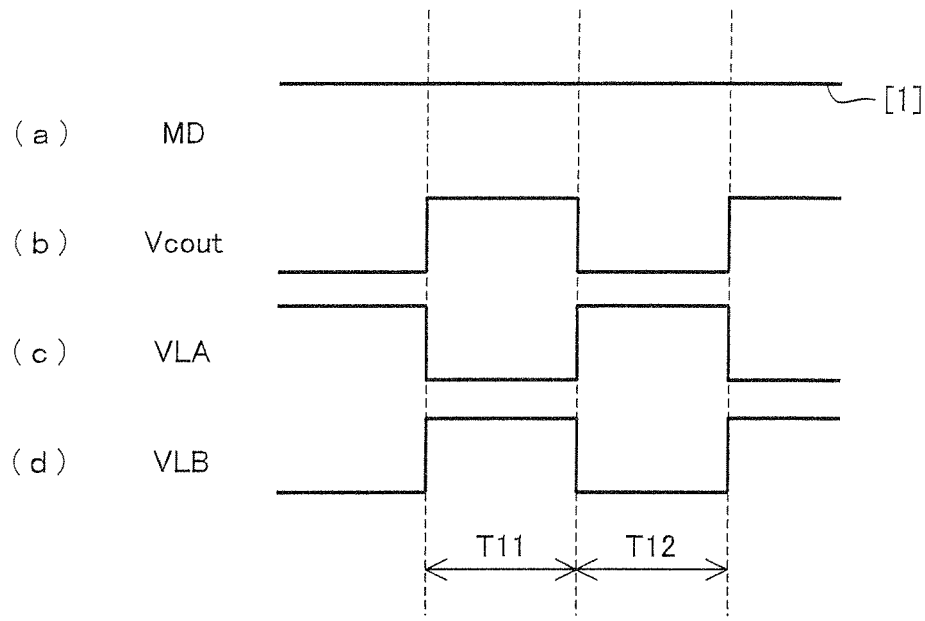
FIG. 7 is a diagram illustrating signal waveforms observed in a case where a black display is carried out in a pixel which has a value of "1" for in-memory data MD.

FIG. 7 is a diagram illustrating signal waveforms observed in a case where a black display is carried out for a pixel unit whose in-memory data MD has a value of "1." Note that for the common electrode 552, inversion driving is carried out both during the normal driving and during the memory driving so as to prevent the liquid crystal from deteriorating in quality due to application of direct-current voltage. In other words, the common electrode 552 has a potential Vcont which is switched between a high potential and a low potential at predetermined intervals.

With attention on the ON/OFF state of the switches SWM3 through SWM7 of a data retaining circuit 559, the switch SWM3 is set to the OFF state while the switch SWM4 is set to the ON state when the in-memory data MD is "1." As such, a power supply voltage having a low potential is supplied from a second power supply line VLCL into the data retaining circuit 559 via the switch SWM4. This in turn sets the switch SWM5 to the ON state and the switch SWM6 to the OFF state. As a result, a power supply voltage having a high potential is supplied from a first power supply line VLCH into the data retaining circuit 559 via the switch SWM5. Since no active signal is supplied to a gate bus line GL during the memory driving as described above, the switch SWM7 is set to the ON state regardless of the value of the in-memory data MD. Thus, the value of the in-memory data MD is retained during the memory driving.

As described above, since a power supply voltage having a low potential is supplied into the data retaining circuit 559 via the switch SWM4, the p-type TFT of the switch SWM1 is set to the ON state, whereas the n-type TFT of the switch SWM2 is set to the OFF state. On the other hand, since a power supply voltage having a high potential is supplied into the data retaining circuit 559 via the switch SWM5, and the switch SWM7 is set to the ON state, the n-type TFT of the switch SWM1 is set to the ON state, whereas the p-type TFT of the switch SWM2 is set to the OFF state. This in turn sets the switch SWM1 to the ON state and the switch SWM2 to the OFF state. As a result, a voltage VLA (hereinafter referred to as "first voltage supply") supplied via a first voltage supply line VLA 506 is applied to a pixel electrode 555R of a corresponding sub-pixel (the same operation is carried out with respect to a pixel electrode of each of the G pixel and the B pixel as well [not shown]).

As indicated by (b) and (c) in FIG. 7, according to the present embodiment, the first voltage supply VLA is set to have (i) a low potential while the potential Vcont of the common electrode 552 is set to have a high potential (that is, during a period T11), and (ii) a high potential while the potential Vcont of the common electrode 552 is set to have a low potential (that is, during a period T12). As such, a high voltage is constantly applied to a liquid crystal capacitor 551R, and a pixel unit including such liquid crystal capacitors 551R carries out a black display.

Figure 8:
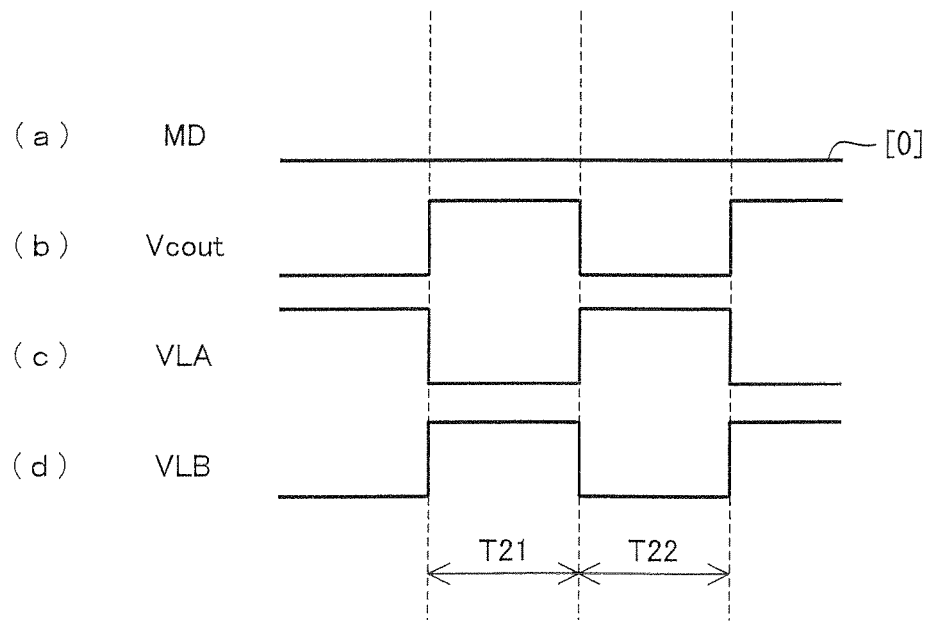
FIG. 8 is a diagram illustrating signal waveforms observed in a case where a white display is carried out in a pixel which has a value of "0" for in-memory data MD.

FIG. 8 is a diagram illustrating signal waveforms observed in a case where a white display is carried out for a pixel whose in-memory data MD has a value of "0." With attention on the ON/OFF state of the switches SWM3 through SWM7 of a data retaining circuit 559, the switch SWM3 is set to the ON state while the switch SWM4 is set to the OFF state when the in-memory data MD is "0." As such, a power supply voltage having a high potential is supplied from a first power supply line VLCH into the data retaining circuit 559 via the switch SWM3. This in turn sets the switch SWM5 to the OFF state and the switch SWM6 to the ON state. As a result, a power supply voltage having a low potential is supplied from a second power supply line VLCL into the data retaining circuit 559 via the switch SWM6. Since no active signal is supplied to a gate bus line GL during the memory driving as described above, the switch SWM7 is set to the ON state as in the case where the value of the in-memory data MD is "1." Thus, the value of the in-memory data MD is retained during the memory driving.

As described above, since a power supply voltage having a high potential is supplied into the data retaining circuit 559 via the switch SWM3, the p-type TFT of the switch SWM1 is set to the OFF state, whereas the n-type TFT of the switch SWM2 is set to the ON state. On the other hand, since a power supply voltage having a low potential is supplied into the data retaining circuit 559 via the switch SWM6, and the switch SWM7 is set to the ON state, the n-type TFT of the switch SWM1 is set to the OFF state, whereas the p-type TFT of the switch SWM2 is set to the ON state. This in turn sets the switch SWM1 to the OFF state and the switch SWM2 to the ON state. As a result, a voltage signal VLB (hereinafter referred to as "second voltage supply") supplied via a second voltage supply line VLB 507 is applied to a pixel electrode 555R of a corresponding sub-pixel (the same operation is carried out with respect to a pixel electrode of each of the G pixel and the B pixel as well [not shown]).

As indicated by (b) and (d) in FIG. 8, according to the present embodiment, the second voltage supply VLB is set to have (i) a high potential while the potential Vcont of the common electrode 552 is set to have a high potential (that is, during a period T21), and (ii) a low potential while the potential Vcont of the common electrode 552 is set to have a low potential (that is, during a period T22). As such, a low voltage is constantly applied to a liquid crystal capacitor 551R, and a pixel unit including such liquid crystal capacitors 551R carries out a white display.

As described above, the liquid crystal display device having the above arrangement includes source bus lines SL 502 which are each electrically shielded by pixel electrodes 504. As such, it is possible to reduce an influence, on the source bus lines SL 502, by the counter voltage applied from the counter electrode of the counter substrate. It follows that it is possible to (i) reduce a change in effective voltage, applied to liquid crystal present in a gap between adjacent pixel electrodes 504, so as to prevent a flicker from occurring due to such a change in effective voltage, and thus (ii) improve display quality.

In addition to the above arrangement, the liquid crystal display device includes a shared voltage supply line 508 in the gap between adjacent pixel electrodes 504 and 504, in which gap a source bus line SL 502 would conventionally be provided. The shared voltage supply line 508 is electrically connected, via a contact hole 509, to each of the first voltage supply lines VLA 506 at a location at which the shared voltage supply line 508 crosses the first voltage supply line VLA 506.

With the above arrangement, a signal applied to the shared voltage supply line 508 is a signal which is identical to a signal applied to the first voltage supply line VLA 506, that is, a voltage which is opposite in phase to the counter voltage applied from the counter electrode. As such, a black display is carried out in the gap between adjacent pixel electrodes 504. It follows that it is possible to (i) substantially eliminate occurrence of a flicker, and thus (ii) improve display quality obtained in a case where the liquid crystal display device is driven at low frequencies.

Embodiment 2

Another embodiment of the present invention is described below.

While Embodiment 1 above describes a liquid crystal display device having an arrangement in which a first voltage signal VLA is applied to the region surrounding each pixel electrode 504, the present embodiment describes a liquid crystal display device having an arrangement in which a second voltage signal VLB is applied to the region surrounding each pixel electrode 504.

Figure 9:
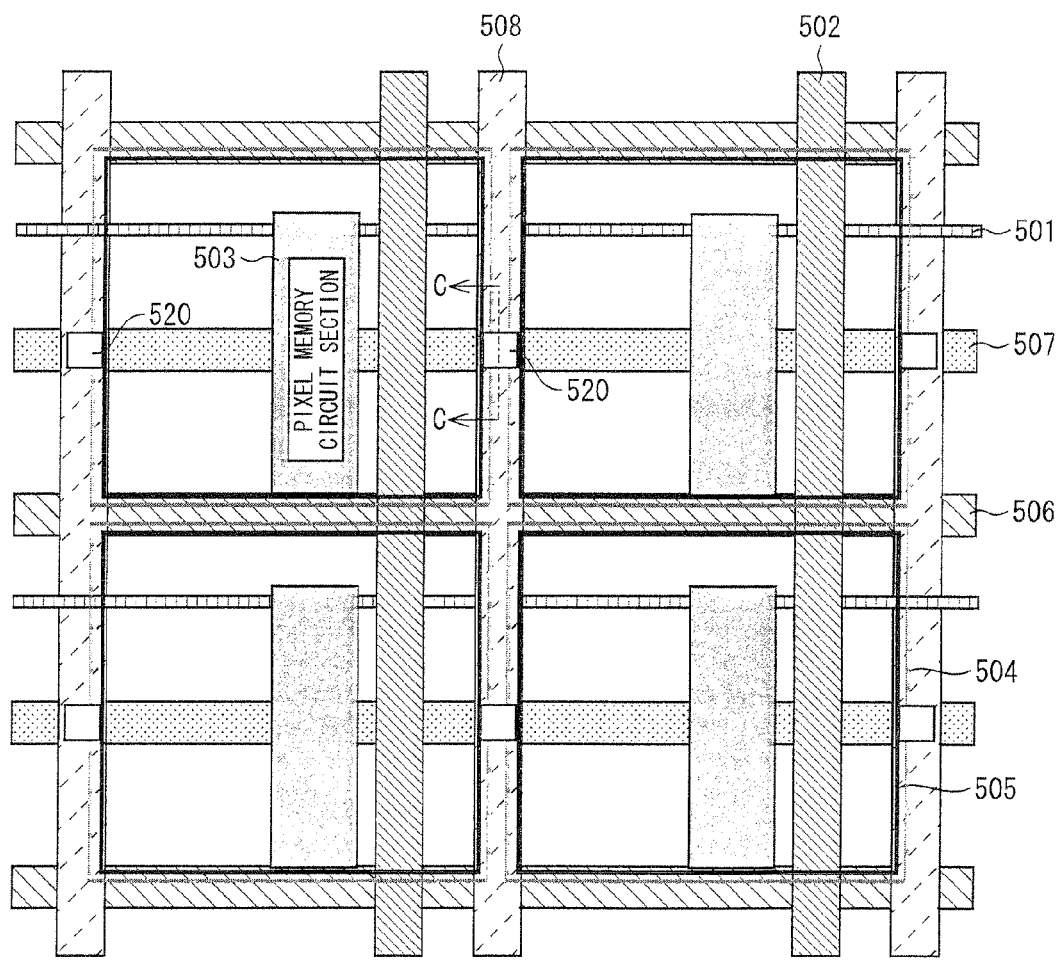
FIG. 9 is a plan view schematically illustrating the vicinity of pixel electrodes in a display section of a liquid crystal display device in accordance with another embodiment of the present invention.

FIG. 9 is a plan view schematically illustrating the vicinity of the pixel electrodes of the display section 500. FIG. 9 omits the counter electrode for convenience of explanation.

The present embodiment differs from Embodiment 1 in that the shared voltage supply lines 508 of the present embodiment are each connected not to the first voltage supply lines VLA 506, but to the second voltage supply lines VLB 507. Except for this point, the present embodiment has an arrangement identical to that of Embodiment 1. A detailed description of the constituents is thus omitted here.

Figure 10:
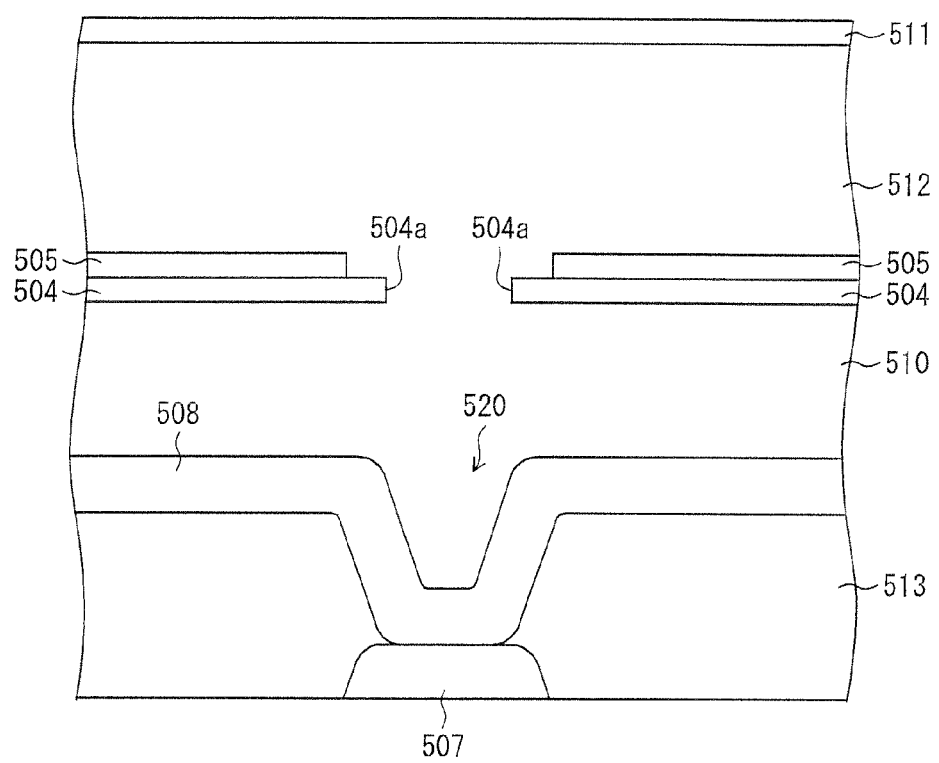
FIG. 10 is a cross-sectional view taken along line C-C of FIG. 9.

FIG. 10 is a cross-sectional view taken along line C-C of FIG. 9.

As illustrated in FIG. 10, the shared voltage supply lines 508 are each electrically connected, via a contact hole 520, to each of the second voltage supply lines VLB 507 provided below the data signal lines 502. The shared voltage supply lines 508 are provided on top of the interlayer insulating film (made of SiO, for example) 513.

Since the shared voltage supply lines 508 are each electrically connected to each of the second voltage supply lines VLB 507 as described above, each of the pixel electrodes 504 is surrounded by a region to which an identical signal, that is, the voltage signal VLB, is applied. In other words, the region surrounding each of the pixel electrodes 504 is supplied with a voltage signal which is identical in phase to the counter voltage applied to the counter electrode 511.

As described above, the liquid crystal display device having the above arrangement includes source bus lines SL 502 which are each electrically shielded by pixel electrodes 504. As such, it is possible to reduce an influence, on the source bus lines SL 502, by the counter voltage applied from the counter electrode of the counter substrate. It follows that it is possible to (i) reduce a change in effective voltage, applied to liquid crystal present in a gap between adjacent pixel electrodes 504, so as to prevent a flicker from occurring due to such a change in effective voltage, and thus (ii) improve display quality.

In addition to the above arrangement, the liquid crystal display device includes a shared voltage supply line 508 in the gap between adjacent pixel electrodes 504 and 504, in which gap a source bus line SL 502 would conventionally be provided. The shared voltage supply line 508 is electrically connected, via a contact hole 520, to each of the second voltage supply lines VLA 507 at a location at which the shared voltage supply line 508 crosses the second voltage supply line VLA 507.

With the above arrangement, a signal applied to the shared voltage supply line 508 is a signal which is identical to a signal applied to the second voltage supply line VLA 507, that is, a voltage which is identical in phase to the counter voltage applied from the counter electrode. As such, a white display is carried out in the gap between adjacent pixel electrodes 504. It follows that it is possible to (i) substantially eliminate occurrence of a flicker, and thus (ii) improve display quality obtained in a case where the liquid crystal display device is driven at low frequencies.

Each of Embodiments 1 and 2 above describes, as illustrated in FIGS. 1 and 9, a configuration in which the first voltage supply lines VLA 506 and the second voltage supply lines VLB 507, both connected to the pixel memory circuit sections 503, extend in parallel to the scanning signal lines 501. This is because the pixel memory circuit sections 503 are each provided so as to have a longitudinal direction parallel to the data signal lines 502 in order to secure a certain aperture ratio and a space for and between the lines in a case where the display section 500 has a small pixel pitch in a right-and-left direction thereof (that is, a direction orthogonal to the data signal lines), as in the case where the liquid crystal display device includes pixels each made up of three sub-pixels of R, G, and B, like in a color liquid crystal display device.

Figure 11:
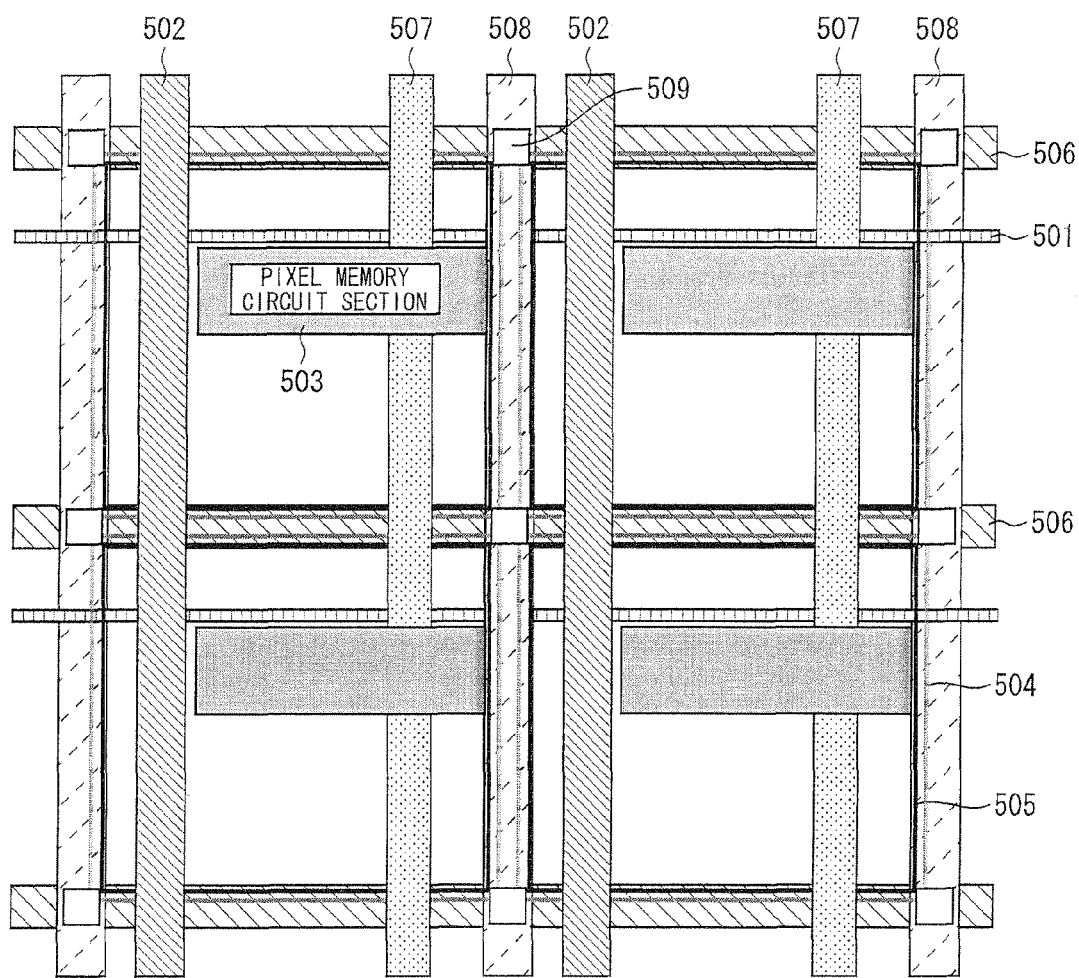
FIG. 11 is a plan view schematically illustrating the vicinity of pixel electrodes in a display section of a liquid crystal display device in accordance with still another embodiment of the present invention.

Thus, in a case where, like in a monochrome liquid crystal display device, the display section 500 has a pixel pitch in the right-and-left direction thereof (that is, the direction orthogonal to the data signal lines) which pixel pitch is (three times) larger than that of a color liquid crystal display device, the pixel memory circuit sections 503 can each be provided so as to have a longitudinal direction parallel to the scanning signal lines 501. In this case, as illustrated in FIG. 11, the first voltage supply lines VLA 506 and the second voltage supply lines VLB 507, both connected to the pixel memory circuit sections 503, extend in parallel to the data signal lines 502, for instance.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention prevents the occurrence of a flicker caused in a case where a liquid crystal display device employs, as one of its display modes, a display mode involving use of a memory function. The present invention is thus applicable to a mobile terminal and an electronic device, such as a mobile telephone, each of which includes a liquid crystal display device that requires a display mode involving the use of a memory function.

REFERENCE SIGNS LIST

20 memory driving control section
100 liquid crystal display panel
200 display control circuit
300 source driver
400 gate driver
500 display section
502 data signal line
503 pixel memory circuit section
504 pixel electrode
504*a* end section
505 reflective electrode
508 shared voltage supply line
509 contact hole
510 resin film
511 counter electrode
512 liquid crystal layer
513 interlayer insulating film
520 contact hole
551 liquid crystal capacitor
552 common electrode
555R pixel electrode
559 data retaining circuit
600 memory driver

The invention claimed is:

1. A liquid crystal display device comprising:
an active matrix substrate;
a counter substrate; and
light-diffusing liquid crystal sealed between the active matrix substrate and the counter substrate, the light-diffusing liquid crystal having, (i) while no voltage is being applied thereto, a first display state in which liquid crystal molecules are aligned irregularly, and (ii) while a voltage is being applied to the light-diffusing liquid crystal, a second display state in which the liquid crystal molecules are oriented regularly, the active matrix substrate including:
a plurality of data signal lines for transmitting a plurality of video signals representative of an image to be displayed;
a plurality of scanning signal lines crossing the plurality of data signal lines;
pixel electrodes provided in a matrix pattern at respective intersections of the plurality of data signal lines with the plurality of scanning signal lines; and
display data memory circuits provided for the respective pixel electrodes, each of the display data memory circuits, in accordance with a video signal transmitted through a corresponding one of the plurality of data signal lines, (i) receiving via a first supply line a first display data for achieving the first display state, and via a second supply line a second display data for achieving the second display state, and (ii) storing the first display data and the second display data, the counter substrate including:
a counter electrode provided so as to face the pixel electrodes of the active matrix substrate, the counter electrode applying a counter voltage to the light-diffusing liquid crystal in synchronization with a voltage applied to each of the pixel electrodes, the active matrix substrate having a first surface which is below a surface thereof on which the pixel electrodes are provided, the first surface having a first region on which a gap between adjacent pixel electrodes is projected, the first region having partial regions which orthogonally cross the plurality of scanning signal lines, the plurality of data signal lines being each provided in a second region located to a direction of one of said adjacent pixel electrodes in relation to a corresponding one of the partial regions.

2. The liquid crystal display device according to claim 1, wherein:
the second region does not overlap said corresponding one of the partial regions.

3. The liquid crystal display device according to claim 2, further comprising:

shared lines provided in the first region so as to be each electrically connected to either first supply lines or second supply lines.

4. The liquid crystal display device according to claim 3, wherein:

the plurality of data signal lines and the shared lines are provided in an identical layer on the active matrix substrate.

5. The liquid crystal display device according to claim 3, wherein;

the first supply lines, the second supply lines, and the shared lines are provided in three respective layers individually separated by an insulating film; and the shared lines are each electrically connected, via a contact hole, to either each of the first supply lines or each of the second supply lines at a location at which the shared line crosses either the first supply line or the second supply line.

6. An active matrix substrate included in a display device in which light-diffusing liquid crystal is sealed, the light-diffusing liquid crystal having, (i) while no voltage is being applied thereto, a first display state in which liquid crystal molecules are aligned irregularly, and (ii) while a voltage is being applied to the light-diffusing liquid crystal, a second display state in which the liquid crystal molecules are oriented regularly, the active matrix substrate comprising:

a plurality of data signal lines for transmitting a plurality of video signals representative of an image to be displayed;

a plurality of scanning signal lines crossing the plurality of data signal lines;

pixel electrodes provided in a matrix pattern at respective intersections of the plurality of data signal lines with the plurality of scanning signal lines; and display data memory circuits provided for the respective pixel electrodes, each of the display data memory circuits, in accordance with a video signal transmitted through a corresponding one of the plurality of data signal lines, (i) receiving via a first supply line a first display data for achieving the first display state, and via a second supply line a second display data for achieving the second display state, and (ii) storing the first display data and the second display data, the active matrix substrate having a first surface which is below a surface thereof on which the pixel electrodes are provided, the first surface having a first region on which a gap between adjacent pixel electrodes is projected, the first region having partial regions which orthogonally cross the plurality of scanning signal lines, the plurality of data signal lines being each provided in a second region which does not overlap a corresponding one of the partial regions, the active matrix substrate further comprising:

shared lines provided in the partial regions so as to be each electrically connected to either first supply lines or second supply lines both connected to the display data memory circuits.

7. The active matrix substrate according to claim 6, wherein:

the plurality of data signal lines and the shared lines are provided in an identical layer.

8. The active matrix substrate according to claim 6, wherein:

the shared lines are each made of a metal wire.

9. An electronic device comprising the liquid crystal display device recited in claim 1.

* * * * *